(12) United States Patent
Sasaki et al.

(10) Patent No.: US 6,773,280 B2
(45) Date of Patent: Aug. 10, 2004

(54) CARD CONNECTOR

(75) Inventors: Shoichi Sasaki, Aichi (JP); Takeshi Fujiwara, Aichi (JP); Koji Shiota, Osaka (JP)

(73) Assignee: U.S.T. Mfg. Co., Ltd. (JP)

( * ) Notice: Subject to any disclaimer, the term of this patent is extended or adjusted under 35 U.S.C. 154(b) by 0 days.

(21) Appl. No.: 10/338,226

(22) Filed: Jan. 8, 2003

(65) Prior Publication Data

US 2003/0139077 A1 Jul. 24, 2003

(30) Foreign Application Priority Data

Jan. 18, 2002 (JP) ........................................ 2002-009554

(51) Int. Cl.$^7$ .............................................. H01R 13/62
(52) U.S. Cl. ........................ 439/159; 439/630; 439/328
(58) Field of Search ................................ 439/159, 160, 439/630, 328

(56) References Cited

U.S. PATENT DOCUMENTS

| | | | | |
|---|---|---|---|---|
| 6,027,351 A | * | 2/2000 | Hashimoto | 439/160 |
| 6,089,889 A | * | 7/2000 | Chiou et al. | 439/159 |
| 6,319,028 B1 | * | 11/2001 | Zhang et al. | 439/159 |
| 6,332,790 B1 | * | 12/2001 | Ishikawa et al. | 439/157 |
| 6,398,567 B1 | * | 6/2002 | Nishimura | 439/159 |
| 6,478,592 B1 | * | 11/2002 | Hu et al. | 439/159 |
| 6,503,092 B1 | * | 1/2003 | Sato | 439/159 |
| 2001/0055896 A1 | * | 12/2001 | Takada et al. | |

FOREIGN PATENT DOCUMENTS

| | | | | |
|---|---|---|---|---|
| JP | 3083778 | 9/1998 | ......... | H01R/13/629 |
| JP | 11-135192 | 5/1999 | ......... | H01R/13/629 |
| JP | 11-149956 | 6/1999 | ......... | H01R/13/639 |
| JP | 3065310 | 10/2000 | ......... | H01R/13/629 |
| JP | 2001-185286 | 7/2001 | ......... | H01R/13/629 |
| JP | 2001-195546 | 7/2001 | ........... | G06K/17/00 |

OTHER PUBLICATIONS

Patent Abstracts of Japan publication No. 11–135192, date of publication May 21, 1999, 2 pages.
Patent Abstracts of Japan publication No. 2001–185286, date of publication Jul. 6, 2001, 2 pages.
Patent Abstracts of Japan publication No. 11–149956, date of publication Jun. 2, 1999, 2 pages.
Patent Abstracts of Japan publication No. 2000–277207, date of publication Oct. 6, 2000, 2 pages.
Patent Abstracst of Japan publication No. 2001–195546, date of publication Jul. 19, 2001, 2 pages.
Patent Abstracts of Japan publication No. 10–255905, date of publication Sep. 25, 1998, 2 pages.

* cited by examiner

*Primary Examiner*—Renee Luebke
*Assistant Examiner*—Larisa Tsukerman
(74) *Attorney, Agent, or Firm*—Osha & May L.L.P.

(57) ABSTRACT

In a card connector of the present invention, an eject plate has a push-moving portion, an engaging portion and a spring portion, and can be switched to two positions by a heart cam. In an electric connecting state of the card and the connector, the eject plate is set to a second position, and its engaging portion is engaged with a notch formed in the card, and the release of the engagement is prevented by a guide wall, and no card can be pulled out even when strong pulling-out force is applied to the card (full lock). When the eject plate is moved from the second position to a first position by a tension spring, the card is pushed out by the push-moving portion. The engaging portion is also engaged with the notch of the card in this first position, but the release of the engagement is allowed by the wall portion, and the card can be pulled out by elastically deforming the spring portion (half lock).

6 Claims, 12 Drawing Sheets

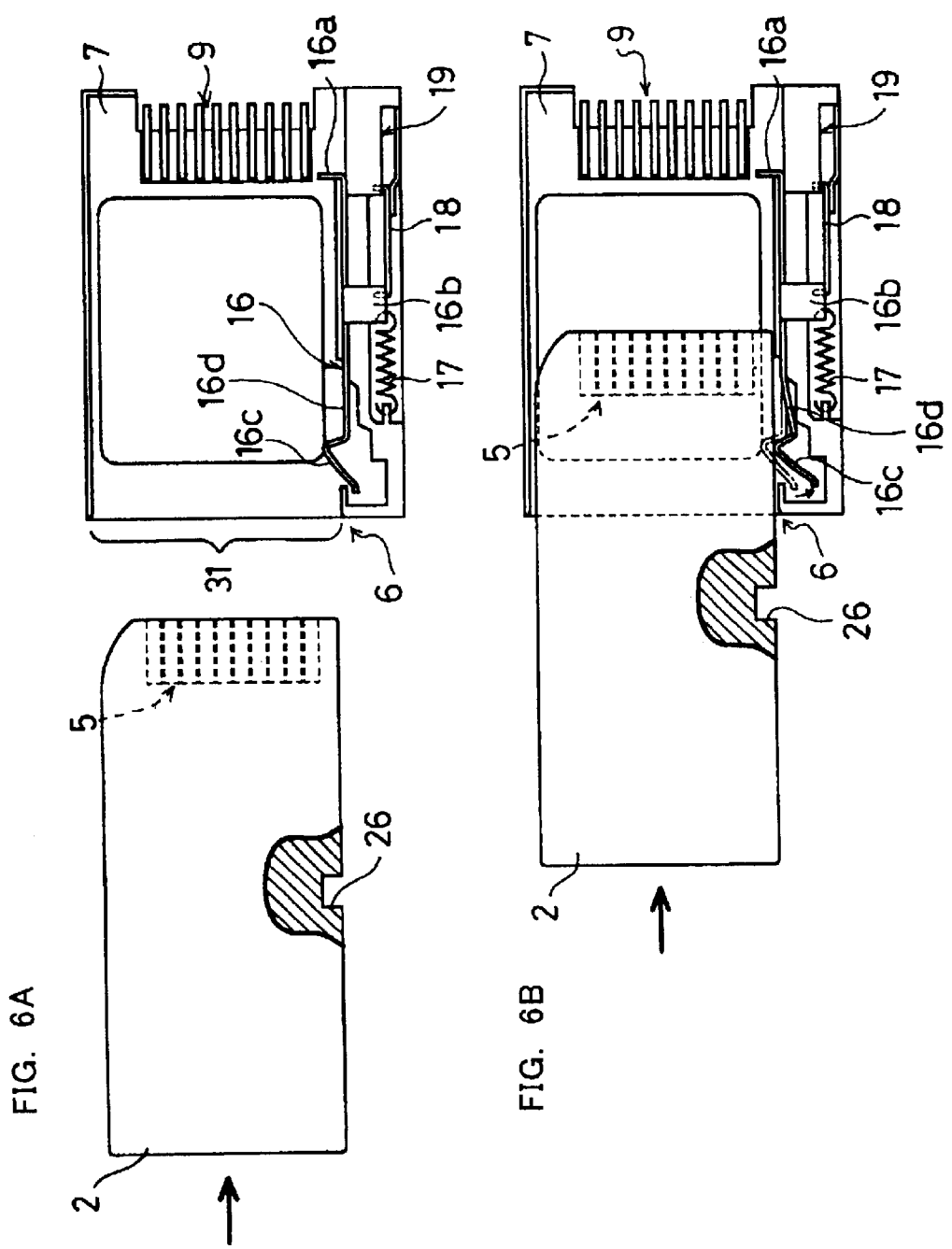

CARD CONNECTOR

BACKGROUND OF THE INVENTION

1. Field of the Invention

The present invention relates to a card connector used in the connection of a card such as a memory card, etc. More particularly, the present invention relates to the construction of an eject mechanism for discharging the inserted card in such a card connector.

2. Description of the Related Art

In recent years, a compact memory card is widely used to record voice data and image data photographed by a digital camera.

It is known that the eject mechanism is arranged so as to discharge the inserted and connected card by a simple operation in the connector on the side of a device using such a card.

When the card is discharged by using such an eject mechanism, there is a fear that the card drops and is damaged when the card is ejected from the connector with strong force. Therefore, it is known that the card connector has a lock mechanism (a so-called half lock mechanism) for holding the card in a state not perfectly pulled out of a card insertion port while the electric connection of an electrode portion and an input-output terminal of the connector is released by suitably pulling-out the card when the eject operation is performed in a connecting state of the card.

In this half lock, the card is held in the card insertion port with suitable holding force. Even when force intended to pull out the card is applied in this state, no card is pulled out when this force is small. Namely, no card is naturally pulled out in the half lock state even when the card insertion port side is turned upside down so as to be downwardly located, or is vibrated by a normal use. In contrast to this, the card can be easily taken out when strong force is applied to the card such that the card is gripped by a hand and is pulled out.

For example, Japanese Patent Laid-Open Nos. 135192/1999 and 2001-185286 disclose a construction having the above half lock mechanism in the card connector of a push-push type using a heart cam mechanism.

On the other hand, in a state in which the card is connected and the electric connection of the electrode portion and the input-output terminal of the connector is made, it is advantageous to arrange a lock mechanism (a so-called full lock mechanism) for preventing the pulling-out of the card with holding force able to resist the strong force when the strong force for gripping and pulling-out the card by the user's hand is applied. This is because the pulling-out of the card due to a mistake of the user can be prevented and erasion and damage of stored contents of the memory card can be prevented.

In this respect, the half lock mechanism is simply arranged and the above full lock mode cannot be set in each of the techniques disclosed in the above Japanese Patent Laid-Open Nos. 135192/1999 and 2001-185286.

On the other hand, the construction for arranging both the half lock mechanism and the full lock mechanism is disclosed in Japanese Patent Laid-Open No. 149956/1999.

However, in this technique, the full lock mechanism and the half lock mechanism are separately constructed and this construction is disadvantageous in view of the number of parts and compactness of the device. Further, when the card is pulled out in this construction, the card must be pulled out after an operation for releasing the full lock is once performed. Accordingly, the user must perform a complicated operation.

Further, the full lock state using the full lock mechanism is a state for resisting force for compulsorily pulling-out the card by the user. Accordingly, the full lock state must be a state in which the card is firmly locked in the connecting state and holding force able to prevent the pulling-out of the card must be shown even when considerably strong force is applied. Further, in the full lock mechanism, durability is also required so as not to be easily damaged and worn even when such strong force is applied many times.

SUMMARY OF THE INVENTION

In consideration of the above problems, an object of the present invention is to provide a card connector able to prevent the card from being naturally pulled out and ejected and extracted in error by adopting two modes constructed by the half lock and the full lock in accordance with cases without damaging the simple operability of the push-push type, and having a simple construction for this prevention and suitable for a reduction in the number of parts and compactness.

The present invention resides in a card connector comprising a housing for forming a card storing space for inserting a card from an opening, and having an input-output terminal corresponding to an electrode portion of the card; an eject member able to be moved along inserting and pulling directions of the card, and switched to a "first position" and a "second position" located on the side far from the opening in comparison with the "first position" by a heart cam mechanism; biasing means for biasing the eject member in the card pulling-out direction; a push-moving portion integrally formed in the eject member, and able to abut on an end portion of the card in its inserting direction; an engaging portion arranged in the eject member, and projected to the card storing space and engaged with a notch formed in the card when the end portion of the card in its inserting direction comes in contact with the push-moving portion; a spring portion arranged in the eject member, and escaping the engaging portion from the card storing space and releasing the engagement of the engaging portion and the notch by elastically deforming the spring portion; and a guide portion arranged in the housing so as to allow the escape of the engaging portion from the card storing space when the eject member is located in the "first position", and prevent the escape of the engaging portion from the card storing space when the eject member is located in the "second position".

In accordance with this construction, the following operations and effects can be attained.

[1] A full lock state is attained in a state in which the card is completely inserted and the eject member is located in the "second position" and the electrode portion is connected to the input-output terminal. In this full lock state, the engaging portion of the eject member is inserted into the notch of the card, and the release of this engagement is prevented by the guide portion, and no card can be pulled out even when strong force is applied to the card. Accordingly, stability of the electric connection is secured even when vibration is applied to the side of a device. Further, the pulling-out of the card performed in error by a user can be prevented.

[2] When an eject operation is performed and the position of the eject member is moved from the "second position" to the "first position" by obtaining biasing force of the biasing means, the push-moving portion of the eject member abuts on the end portion of the card in its inserting direction, and pushes out the card in the pulling-out direction. Thus, the perfect inserting state of the card in the above [1] is released.

At this time, since the inserting state of the engaging portion into the notch of the card is maintained by the action of the spring portion, the card is not forcibly ejected from the card storing space, but is held in a position corresponding to the "first position" of the eject member.

[3] A half lock state is set when the eject member is located in the "first position". In this state, no card is pulled out of the connector when the device is turned upside down so as to downwardly direct this side of the housing and vibration is caused approximately by a normal use. On the other hand, the release of the engagement of the engaging portion and the notch is allowed by the guide portion. Accordingly, when pulling-out force stronger than the biasing force of the spring portion is applied to the card as in the pulling-out of the card performed by the user, etc., the engagement of the engaging portion and the notch is released by the elastic deformation of the spring portion so that the card can be easily pulled out.

In the card connector of the present invention, the above engaging portion and the above spring portion are preferably integrally formed in the eject member.

The number of parts and manufacture cost/the number of processes can be reduced by this construction.

In the card connector of the present invention, the above eject member may be formed by synthetic resin.

The eject member can be cheaply constructed by a small process number and manufacture cost can be reduced by this construction.

The present invention also resides in a card connector comprising a housing for forming a card storing space for inserting a card from an opening, and having an input-output terminal corresponding to an electrode portion of the card; an eject member able to be moved along inserting and pulling directions of the card, and switched to a "first position" and a "second position" located on the side far from the opening in comparison with the "first position"; biasing means for biasing the eject member in the card pulling-out direction; a push-moving portion integrally formed in the eject member, and able to abut on an end portion of the card in its inserting direction; an engaging portion arranged in the eject member, and projected to the card storing space and engaged with a notch formed in the card when the end portion of the card in its inserting direction comes in contact with the push-moving portion; a spring portion arranged in the eject member, and escaping the engaging portion from the card storing space and releasing the engagement of the engaging portion and the notch by elastically deforming the spring portion; and a guide portion arranged in the housing so as to allow the escape of the engaging portion from the card storing space when the eject member is located in the "first position", and prevent the escape of the engaging portion from the card storing space when the eject member is located in the "second position"; wherein at least the engaging portion of the eject member is formed by synthetic resin, and the engaging portion is formed in a thick wall shape.

In accordance with this construction, even when the card is pulled out in error by compulsory force in the full lock state for connecting the card to the connector, plastic deformation of the engaging portion is prevented so that durability of the eject member is excellent.

The present invention further resides in a card connector comprising a housing for forming a card storing space for inserting a card from an opening, and having an input-output terminal corresponding to an electrode portion of the card; an eject member able to be moved along inserting and pulling directions of the card, and switched to a "first position" and a "second position" located on the side far from the opening in comparison with the "first position"; biasing means for biasing the eject member in the card pulling-out direction; a push-moving portion integrally formed in the eject member, and able to abut on an end portion of the card in its inserting direction; an engaging portion arranged in the eject member, and projected to the card storing space and engaged with a notch formed in the card when the end portion of the card in its inserting direction comes in contact with the push-moving portion; a spring portion arranged in the eject member, and escaping the engaging portion from the card storing space and releasing the engagement of the engaging portion and the notch by elastically deforming the spring portion; and a guide portion arranged in the housing so as to allow the escape of the engaging portion from the card storing space when the eject member is located in the "first position", and prevent the escape of the engaging portion from the card storing space when the eject member is located in the "second position"; wherein the guide portion is constructed such that the engaging portion engaged with the notch of the card can reduce a projecting amount to the card storing space when the card is connected to the connector and the eject member is held in the "second position" and pulling-out force is applied to the card; and a regulating portion able to prevent the displacement of the eject member to the "first position" is formed in the guide portion when the engaging portion of the eject member located in the "second position" reduces the projecting amount to the card storing space.

In accordance with this construction, when it is intended that the card is forcibly pulled out in the full lock state for connecting the card to the connector, the engaging portion reduces the projecting amount to the card storing space, and the regulating portion prevents the movement of the eject member from the "second position" to the "first position" at this time. Accordingly, the mistaken pulling-out of the card is reliably prevented, and situations such as the erasion of stored contents of the card, etc. can be avoided. Further, it is prevented that the engaging portion of the eject member is broken by plastic deformation, and durability of the eject member is excellent.

Other and further objects, features and advantages of the invention will appear more fully from the following description taken in connection with the accompanying drawings.

BRIEF DESCRIPTION OF THE DRAWINGS

FIG. 5 is a view showing a situation for allowing/preventing the escape of an engaging portion in accordance with the position of an eject plate, where

FIG. 6 is a view showing a situation in which the card is inserted into the connector from FIG. 6A to FIG. 6B.

DESCRIPTION OF THE PREFERRED EMBODIMENTS

A card connector in accordance with one preferred embodiment mode of the present invention will next be explained with reference to the drawings.

Figure 1:
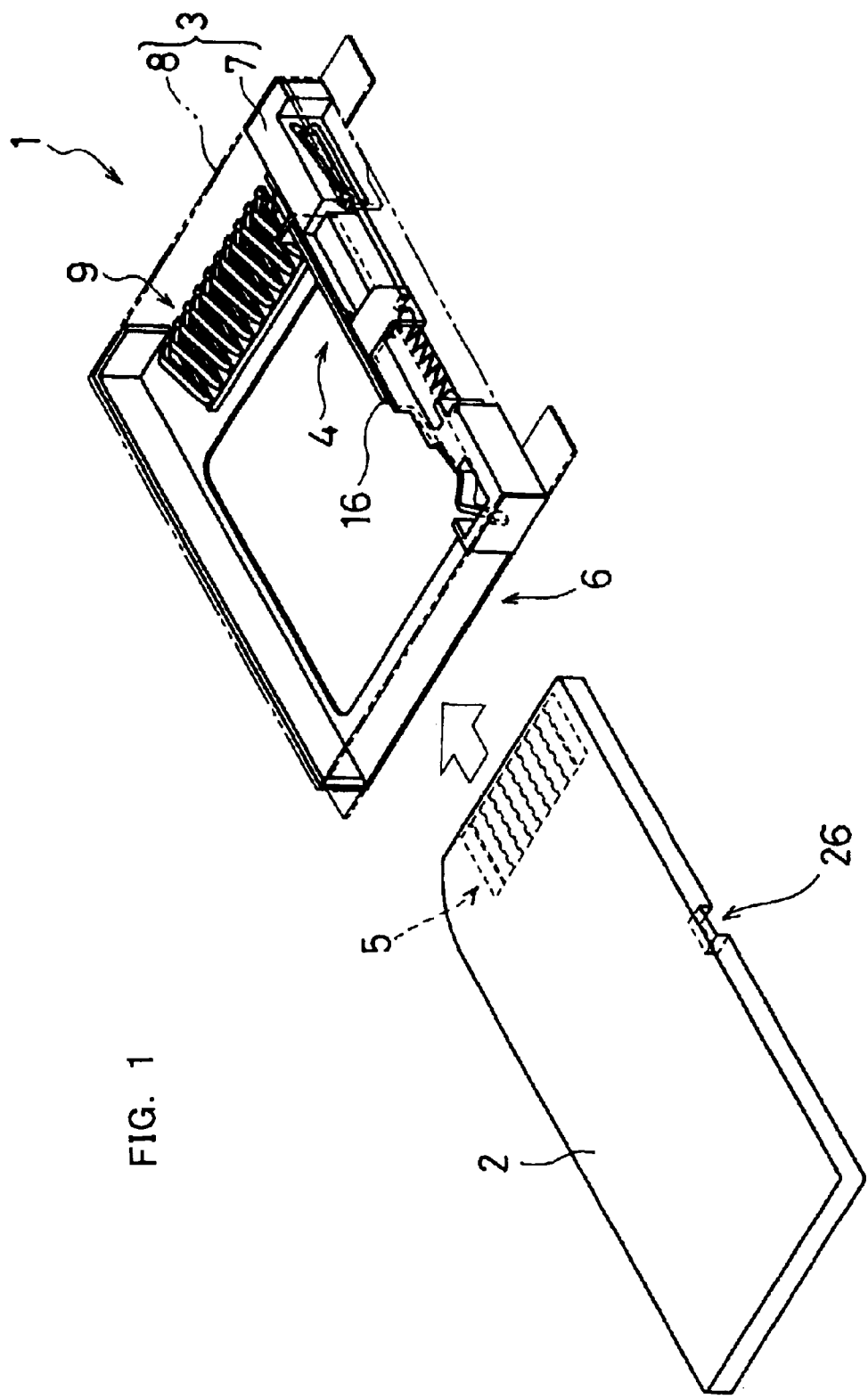
FIG. 1 is a perspective view showing the entire construction of a connector in accordance with one embodiment mode of the present invention and a card inserted into this connector.

In a first embodiment mode shown in FIG. 1, a card connector 1 has a housing 3 for storing a card 2, and an eject mechanism 4 assembled into the housing 3. The card 2 is a memory card used in a mobile electronic device such as a digital camera, etc., and can record, e.g., image data photographed by the digital camera. Ten face-shaped electrode portions 5 are arranged in parallel with each other on the lower face of one end portion of this card 2 in its longitudinal direction.

Figure 2:
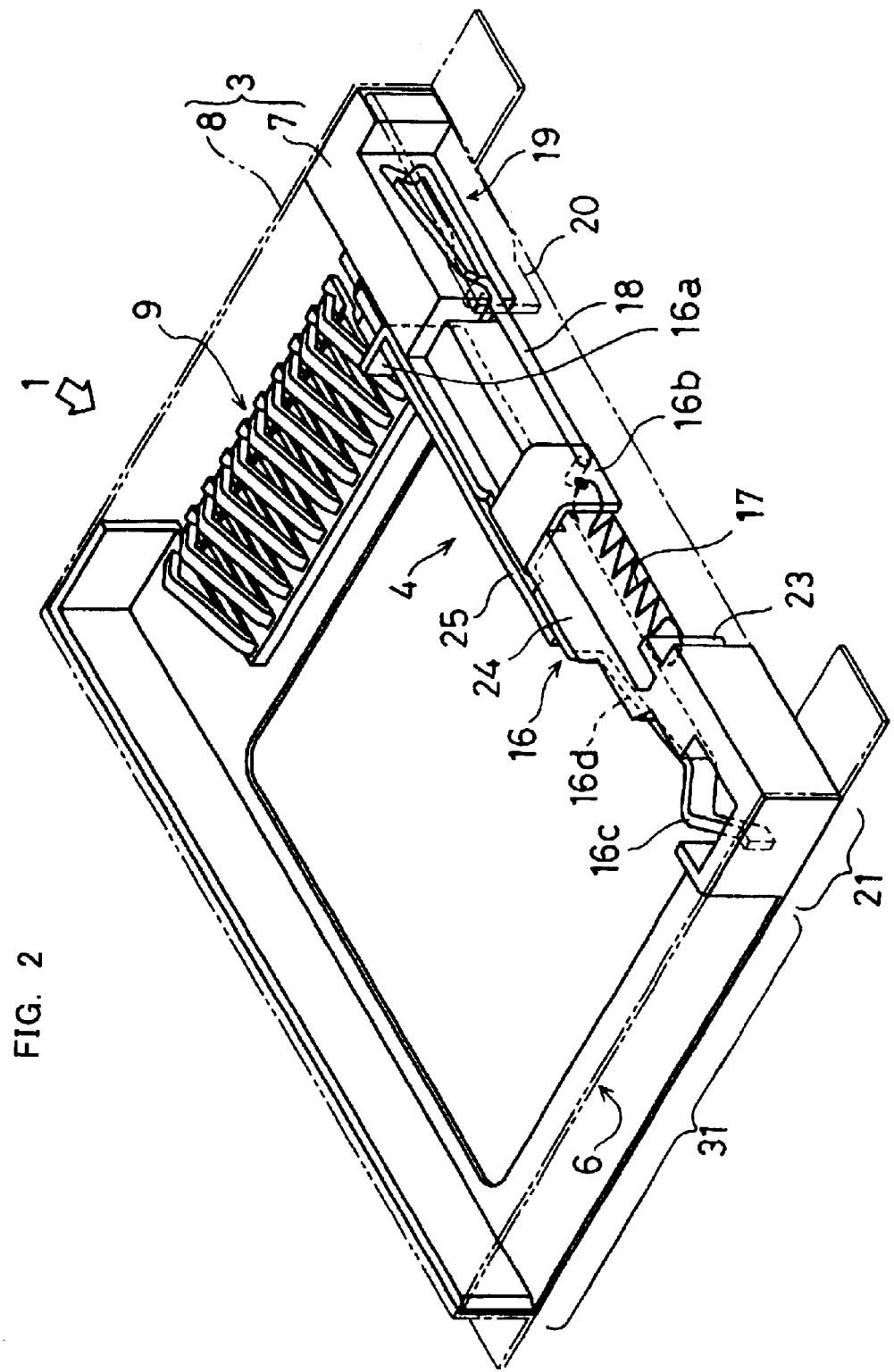
FIG. 2 is a perspective view of the connector.

As shown in FIG. 2 as an enlarged view of the connector 1, an opening 6 is formed in the housing 3, and a storing space 31 of the card 2 is formed within this housing 3. This housing 3 has a lower side half portion 7 formed by synthetic resin, and an upper side half portion 8 for covering the upper face of this lower side half portion 7 and manufactured by a metal. In FIGS. 1 and 2, for convenience of the illustration of the internal space of the housing 3, the upper side half portion 8 to be originally shown by a solid line is perspectively illustrated by a chain line.

The lower side half portion 7 is approximately formed in a concave shape seen from the above opening 6 side. When the card 2 is inserted from the opening 6, the lower side half portion 7 can guide the lower face of the card 2 and its both side edges.

An input-output terminal 9 is arranged on the deep side of the lower side half portion 7, and is molded by bending an electrically conductive leaf spring formed in an elongated band shape. Ten input-output terminals 9 are arranged correspondingly to the above face-shaped electrode portions 5 of the card 2. When the card 2 is perfectly inserted until the interior of the housing 3, the input-output terminal 9 is electrically connected to the face-shaped electrode portion 5.

The eject mechanism 4 will be explained with reference to FIG. 2 as an enlarged view of the connector 1 and FIG. 3 as a plan view of the connector 1. This eject mechanism 4 is constructed by an eject plate 16 (eject member) able to push and move an end portion of the card 2 in its inserting direction, a tension spring (biasing means) 17 for biasing the eject plate 16 in the pulling-out direction of the card 2, a rod 18 having one end connected to the eject plate, and a heart cam 19 engaged with the other end of the rod 18, and a leaf spring 20 for pressing an end portion of the rod 18 on the engaging side of the heart cam 19.

The eject plate 16, the tension spring 17, the rod 18, the heart cam 19 and the leaf spring 20 are arranged in an extension portion 21 formed in a side portion of one side of the lower side half portion 7 of the housing 3 (a side portion on the right-hand side seen toward the opening 6 in this embodiment mode).

In the eject plate 16, a push-moving portion 16a is constructed by perpendicularly bending one end of an elongated plate-shaped member having a uniform thickness and manufactured by a metal so as to be projected on the card storing space 31 side. This push-moving portion 16a is arranged to abut on the end portion of the card 2 in its inserting direction and push and move the card 2 in the pulling-out direction when an eject operation described later is performed.

An elongated guide wall 24 is perpendicularly formed in the lower side half portion 7 of the housing 3 such that the longitudinal direction of the elongated guide wall 24 is set along the inserting and pulling-out directions of the card. A thin support wall 25 is perpendicularly formed along the guide wall 24 at a small interval (an interval corresponding to the thickness of the eject plate 16) from the guide wall 24 so that an intermediate portion of the eject plate 16 is nipped between the guide wall 24 and the support wall 25. Thus, the eject plate 16 can be moved along the inserting and pulling-out directions of the card while the eject plate 16 is nipped and supported between the guide wall 24 and the support wall 25.

In an intermediate portion of the eject plate 16, a connecting portion 16b having an L-shape formed by continuously connecting a horizontal portion and a vertical portion is formed in a shape transversally projected at the upper edge of this intermediate portion. This connecting portion 16b is formed so as to detour the guide wall 24 from the upper side, and a hole for engaging the above tension spring 17 and the rod 18 is formed in the vertical portion of this connecting portion 16b.

One end of the tension spring 17 is engaged with the connecting portion 16b of the above eject plate 16, and the other end is engaged with the engaging wall 23 arranged in the extension portion 21 of the housing 3 so that the tension spring 17 biases the eject plate 16 at any time in the pulling-out direction of the card. A "first position" of the eject plate 16 described later is prescribed by making the above push-moving portion 16a formed in the eject plate 16 come in contact with an end portion of the above support wall 25 as shown in FIG. 3.

One end of the rod 18 transversally bent is engaged with the connecting portion 16b of the above eject plate 16, and the other end similarly transversally bent is engaged with the heart cam 19 explained below.

Figure 4:
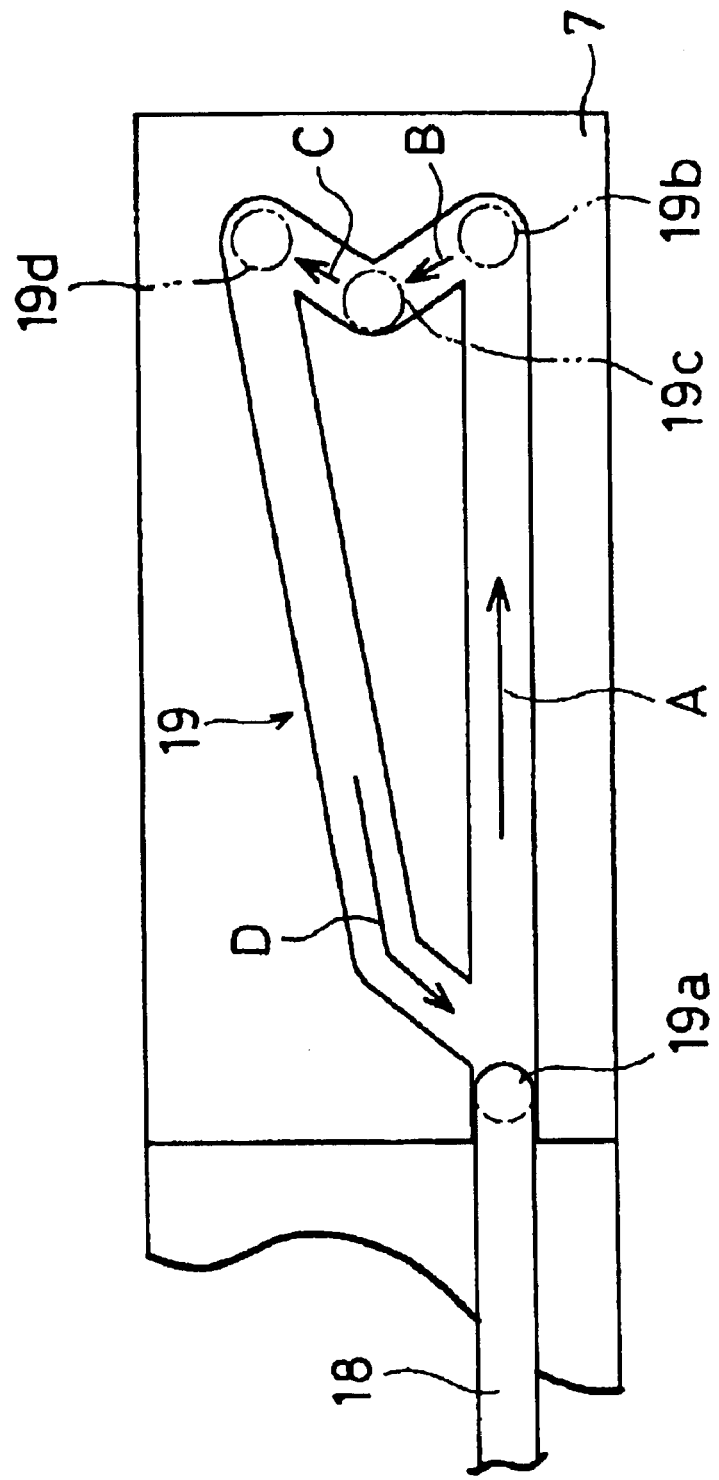
FIG. 4 is an enlarged side view showing the main portion of a heart cam mechanism.

As shown in FIG. 4 as an enlarged side view showing the main portion of this heart cam 19, the heart cam 19 is constructed by grooves in which a first point 19a, a first bending point 19b, a second point 19c and a second bending point 19d are continuously formed approximately in a heart shape. These grooves are formed in the side wall of the extension portion 21 on the deep side of the housing. A step difference and an inclination are suitably formed (not illustrated) in the bottom portion of this cam groove. The tip of the rod 18 is transversally biased in the direction inserted into the groove by the above leaf spring 20 arranged so as to cover the groove, and comes in contact with the bottom portion of the cam groove.

In this construction, when the eject plate 16 is located in a position (hereinafter called a "first position") shown in FIG. 3, the tip of the rod 18 connected to the eject plate 16 is located at the first point 19a.

When the eject plate 16 is pushed against the biasing force of the tension spring 17 from this state in the inserting direction of the card, the tip of the rod 18 connected to the eject plate 16 is moved as shown by an arrow A of FIG. 4, and reaches the first bending point 19*b* from the first point 19*a*. When the push-moving force is released from this state, the tip of the rod 18 is moved as shown by an arrow B of FIG. 4, and reaches the second point 19*c* and is engaged with this second point 19*c*. As this result, the eject plate 16 is rested in a position (a position on the side far from the opening 6 in comparison with the above "first position" and is hereinafter called a "second position") on the side of the housing 3 deeper than the "first position" of FIG. 3.

When the eject plate 16 located in this "second position" is next further pushed and moved in the inserting direction of the card, the tip of the rod 18 connected to the eject plate 16 reaches the second bending point 19*d* from the second point 19*c* as shown by an arrow C. The tip of the rod 18 moves the cam groove as shown by an arrow D by releasing the pushing movement from this state, and the eject plate 16 applying the elastic force of the tension spring 17 thereto is returned to the above "first position".

Thus, the heart cam 19 can be held by switching the position of the eject plate 16 connected to the cam through the rod 18 to the "first position" corresponding to the first point 19*a* and the "second position" corresponding to the second point 19*c*.

Thus, a rational method can be adopted by constructing the connector of a push-push type utilizing the heart cam 19 when the card once connected is pulled out. In this rational method, [1] the card is slightly pushed in toward the deep side of the housing by pushing the end portion of the card by a finger in a state projected from the opening to the exterior, and [2] the discharged card is pulled out by gripping this card by this finger.

This method is very simple in comparison with the case of the connector (a connector described in e.g., Japanese Patent No. 3065310) of a construction having an eject button. Namely, when the connected card is detached in the connector of the eject button type, [1] an operation (card eject operation) for pushing-in the eject button normally arranged by the side of an opening by a finger is performed, and [2] an operation for gripping and pulling-out the end portion of the card must be then performed, and fingers must be located in two positions of the eject button and the card slightly separated from each other. In contrast to this, in the connector of the push-push type, the card eject operation can be performed by slightly pushing-in the end portion of the card by a finger. Accordingly, it is possible to then rapidly proceed to an operation for gripping the card end portion. Therefore, a smart card pulling-out method able to attain the object by a small movement of the finger can be provided to a user.

Further, since no eject button is required in the above connector of the push-push type, the number of parts can be reduced and no space for assembling the eject button is required so that the space can be suitably saved.

Further, in the connector of the eject button type, a connector mounting device side is restricted in design by the existence of this eject button. When the eject button is conversely preferentially arranged in the connector mounting device to improve convenience at the time of the card pulling-out operation of the user, etc., the degree of freedom in the design of the connector is correspondingly reduced. When it is intended that the requirement of such an arrangement of the eject button is satisfied, the addition of a special part is required and the occupying area of the connector is increased. In contrast to this, there are no such disadvantages in the connector of the push-push type.

Figure 3:
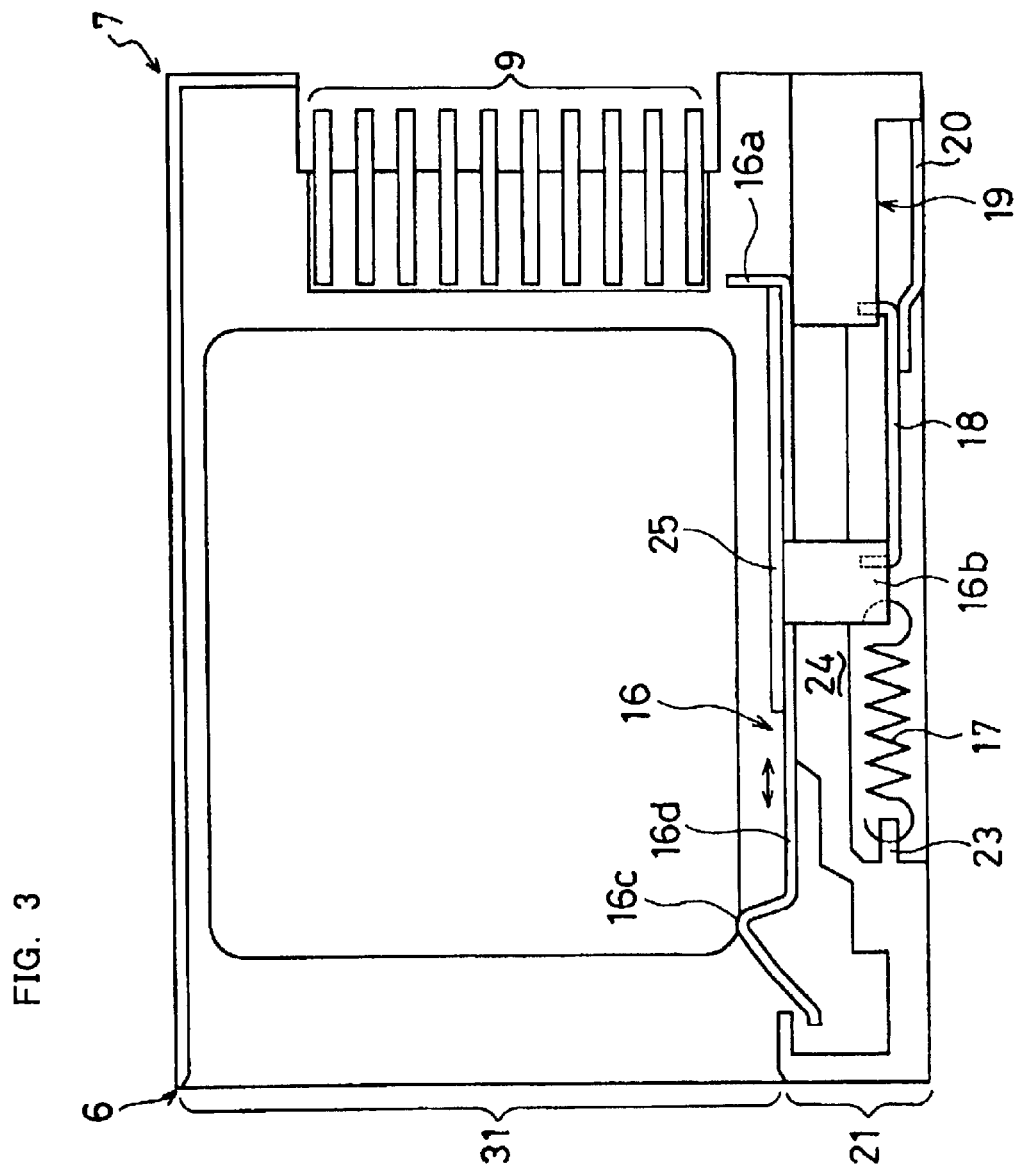
FIG. 3 is a plan view of the connector.

As shown in FIG. 3, the engaging portion 16*c* projected to the card storing space 31 from the side is constructed by bending the end portion of the eject plate 16 in the card pulling-out direction approximately in an L-shape. This engaging portion 16*c* is arranged to be engaged with a notch (reference numeral 26 of FIG. 1) formed on one side face of the card 2. When the card 2 is inserted into the connector 1 and its end portion in the inserting direction comes in contact with the push-moving portion 16*a* of the above eject plate 16, its position relation is determined such that the engaging portion 16*c* is inserted into the above notch 26.

The eject plate 16 is formed by a metallic raw material having a spring property, and a spring portion 16*d* able to be elastically deformed is integrally formed in a portion directed from an intermediate portion of the eject plate 16 to the engaging portion 16*c* (FIG. 3).

As shown in the enlarged view of FIG. 5, the above guide wall 24 (guide portion) formed on one side face of the eject plate 16 is shaved in a step shape as the guide wall 24 approaches the opening 6 side of the housing 3. Thus, an escaping space S is formed between the guide wall 24 and the eject plate 16.

Figure 5A:
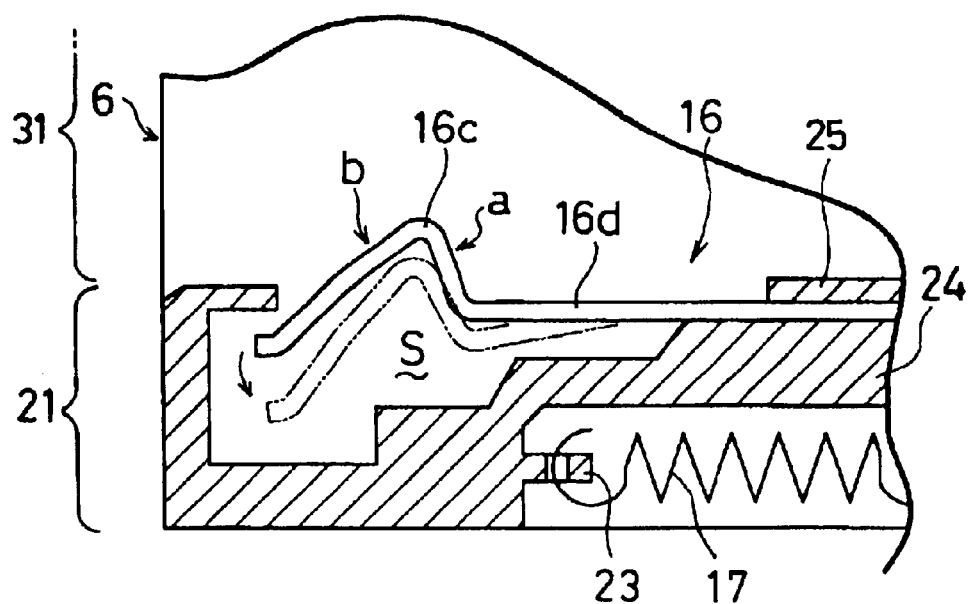
FIG. 5A shows a "first position" of the eject plate.

When the eject plate 16 is located in the above "first position" in this construction, its engaging portion 16*c* and the spring portion 16*d* face the escaping space S as shown in FIG. 5A. As this time, as shown by a chain line in this figure, the engaging portion 16*c* can be escaped from the card storing space 31 to the side by elastically deforming the spring portion 16*d*.

Figure 5B:
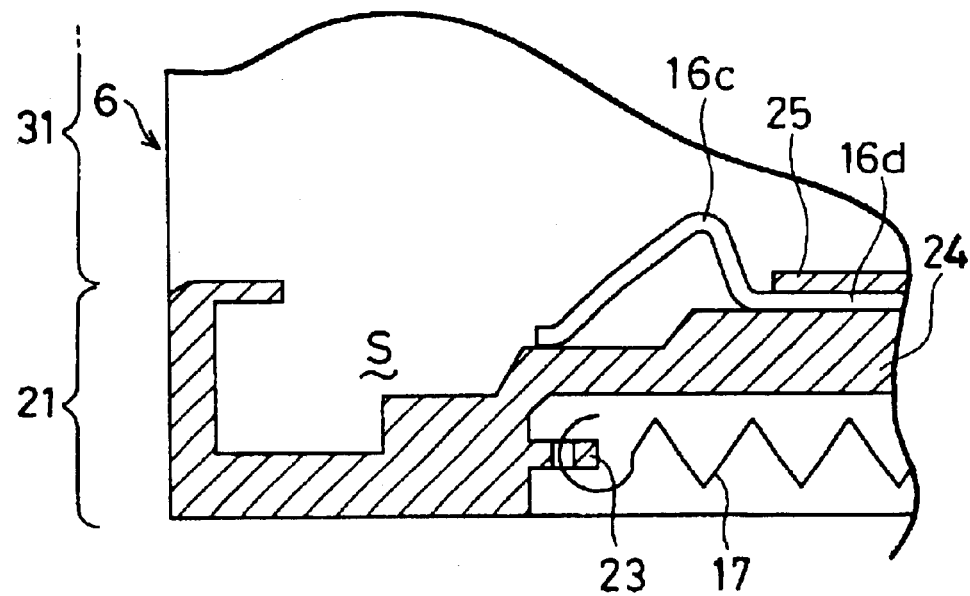
FIG. 5B shows a "second position" of the eject plate.

On the other hand, when the eject plate 16 is located in the above "second position", its engaging portion 16*c* and the spring portion 16*d* go away from the opening 6. As a result, as shown in FIG. 5B, the engaging portion 16*c* and the spring portion 16*d* come in contact with the guide wall 24. Accordingly, there is no room for the elastic deformation of the spring portion 16*d* so that no engaging portion 16*c* can be escaped from the card storing space 31.

As shown in the enlarged view of FIG. 5A, this engaging portion 16*c* is formed in a shape in which the engaging portion 16*c* is projected into the card storing space 31 at a slight sharp angle (portion a) as the engaging portion 16*c* approaches the opening 6, and the projecting amount is reduced at a slight gentle angle (portion b) after the projecting amount is set to a maximum. Thus, when the card 2 is inserted, the engaging portion 16*c* is easily escaped by the action of the portion b so that the card 2 can be smoothly inserted. In contrast to this, when the engaging portion 16*c* is engaged with the notch 26 of the card 2 as described later, it is considered that slightly large pulling-out force is required to escape the engaging portion 16*c* by the action of the portion a in releasing this engagement and pulling-out the card 2.

In the above construction, the connecting situation of the card 2 to the connector 1 will be explained with reference to FIGS. 6A and 6B and FIGS. 7C and 7D.

First, FIG. 6A shows a state in which no card 2 is inserted at all. At this time, the position of the eject plate 16 is set to the "first position" on the side close to the opening 6, and the engaging portion 16*c* of the eject plate 16 is projected toward the card storing space 31.

FIG. 6B shows a state in which one portion of the card 2 is inserted into the card storing space from the opening 6. At this time, a side edge of the card 2 abuts on the engaging portion 16c projected toward the card storing space 31, but the eject plate 16 is set to the "first position" as mentioned above. Therefore, the engaging portion 16c can be escaped as shown by a chain line of FIG. 5A. Accordingly, as shown in FIG. 6B, the engaging portion 16c is escaped from the card storing space 31 by elastically deforming the spring portion 16d so as to be pushed away on the side by the side edge of the card 2 so that no engaging portion 16c obstructs the insertion of the card 2.

Figure 7C:
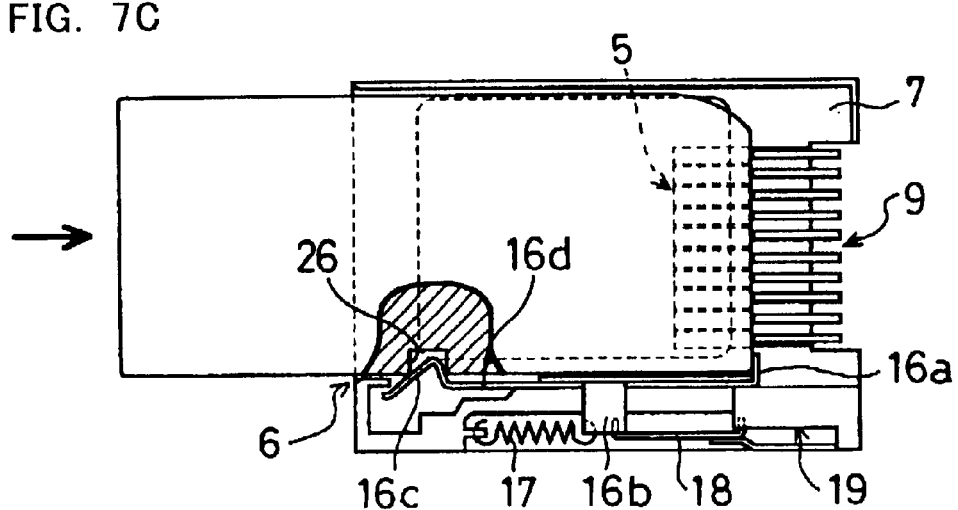
FIG. 7 is a view showing a situation in which the card is pushed-in subsequently to FIG. 6 and attains the states of a half lock of FIG. 7C and a full lock of FIG. 7D.

As shown in FIG. 7C, when the end portion of the card 2 in its inserting direction abuts on the push-moving portion 16a of the eject plate 16 located in the "first position", the notch 26 of the above card 2 is simultaneously located in the position of the above engaging portion 16c, and the engaging portion 16c is again projected to the card storing space 31 by restoring force of the above spring portion 16d, and is engaged with the notch 26.

This state of FIG. 7C is a half lock state. Namely, the engaging portion 16c and the notch 26 are engaged with each other in the state of FIG. 7C. Accordingly, no card 2 is pulled out even when the connector 1 is directed so as to downwardly locate the opening 6, or vibration caused approximately by the normal use of a device is applied to the card 2. In contrast to this, the eject plate 16 is set to the "first position", and the engagement of the engaging portion 16c and the notch 26 can be released by the elastic deformation of the spring portion 16d. Accordingly, the card 2 can be easily pulled out if pulling-out force stronger than the elastic force of the spring portion 16d is applied to the card 2.

When the card 2 is further pushed-in from the state of FIG. 7C, the end portion of the card 2 in its inserting direction pushes-in the push-moving portion 16a of the eject plate 16 on the deep side of the housing 3, and the entire eject plate 16 is moved in the direction separated from the opening 6. At this time, the engaging state of the engaging portion 16c of the eject plate 16 and the notch 26 of the card 2 is maintained as it is.

When the eject plate 16 is pushed-in, the tip of the rod 18 connected to the eject plate 16 is moved from the first point 19a within the cam groove of the heart cam 19 as shown by an arrow A of FIG. 4, and reaches the first bending point 19b. As the pushing-in force of the card 2 is released, the tip of the rod 18 is moved as shown by an arrow B of FIG. 4 and reaches the second point 19c and is engaged with this second point 19c.

Figure 7D:
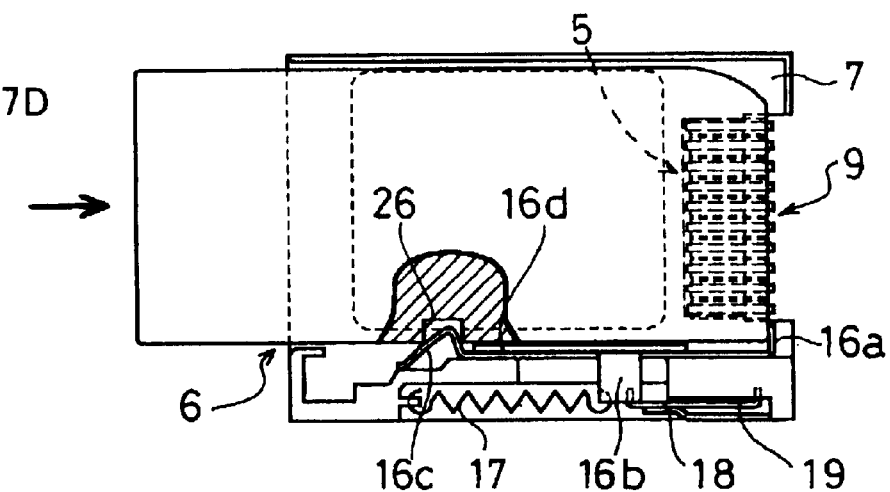

As this result, as shown by FIG. 7D, the face-shaped electrode portion 5 of the card 2 is electrically connected to the input-output terminal 9, and the eject plate 16 is held by the above heart cam 19 in the "second position". Thus, the connection of the card 2 is completed.

This state of FIG. 7D is a full lock state. Namely, in the state of FIG. 7D, the engaging portion 16c and the notch 26 of the card 2 are engaged with each other, and the eject plate 16 is located in the "second position". Accordingly, since the escapement of the engaging portion 16c from the card storing space is prevented by the guide wall 24 as shown in FIG. 5B, no engagement with the notch 26 can be released.

As shown in FIG. 7D, the engaging portion 16c and the notch 26 are finally strongly engaged with each other (so as not to be released) in a state in which the face-shaped electrode portion 5 of the card 2 and the input-output terminal 9 are electrically connected to each other. As a result, an error in the pulling-out of the card 2 is prevented, and the erasion and damage of stored contents of the memory card can be prevented.

As mentioned above, in this embodiment mode, the full lock state is attained since [1] the eject plate 16 is held by the heart cam mechanism 19 in the "second position", and [2] the engaging portion 16c of the eject plate 16 and the notch 26 of the card 2 are engaged with each other and the release of this engagement is prevented by the guide wall 24.

In other words, it can be said that the role of the full lock of the card 2 is also played by the heart cam mechanism 19 for switching the position of the eject member 16. Namely, this construction is excellent since it is not necessary to particularly arrange a member for the full lock, and the number of parts is not increased.

The pulling-out situation of the card 2 from the connector 1 will next be explained with reference to FIGS. 8E and 8F and FIGS. 9G and 9H.

Figure 8E:
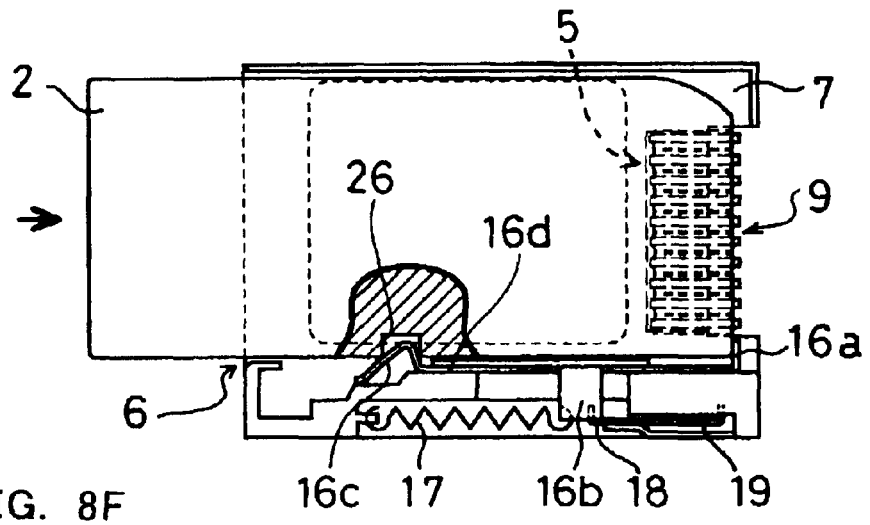
FIG. 8 is a view showing a situation in which the card is transferred from a card connecting state (full lock) of FIG. 8E to the state of a half lock of FIG. 8F.

FIG. 8E is a view completely similar to FIG. 7D, and shows a state in which the face-shaped electrode portion 5 of the card 2 is connected to the input-output terminal 9 and the full lock is set.

A user pushes-in the card 2 by a slight stroke to release this connecting state. Thus, the eject plate 16 is pushed by the card 2, and the tip of the rod 18 connected to the eject plate 16 reaches the second bending point 19d along an arrow C from the second point 19c of FIG. 4. As the pushing-in force of the card 2 applied by the user is released, the eject plate 16 is moved from the "second position" to the "first position" by receiving tensile force of the tension spring 17 (at this time, the tip of the rod 18 is moved from the second bending point 19d to the first point 19a as shown by an arrow D). The card 2 is pushed out by the push-moving portion 16a of the eject plate 16 in the card pulling-out direction, and releases the electric connection of the face-shaped electrode portion 5 and the input-output terminal 9. This state is shown in FIG. 8F.

Figure 8F:
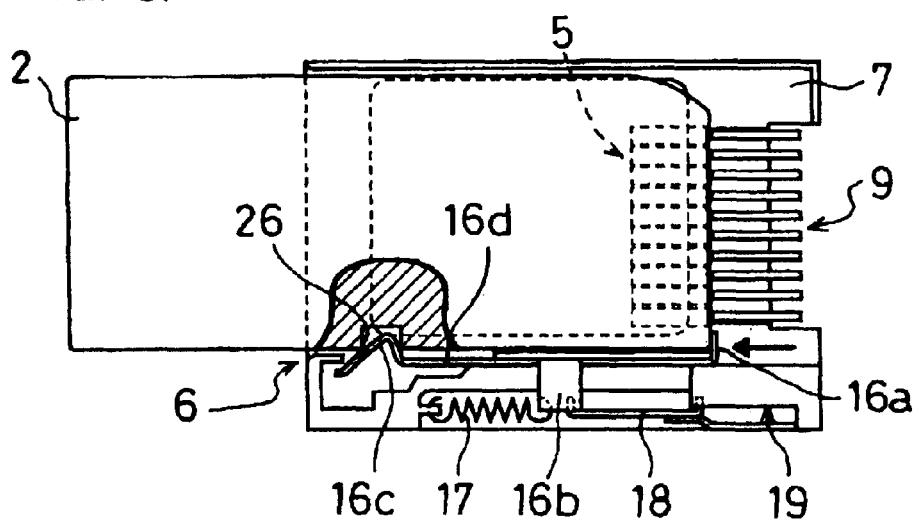
Figure 9G:
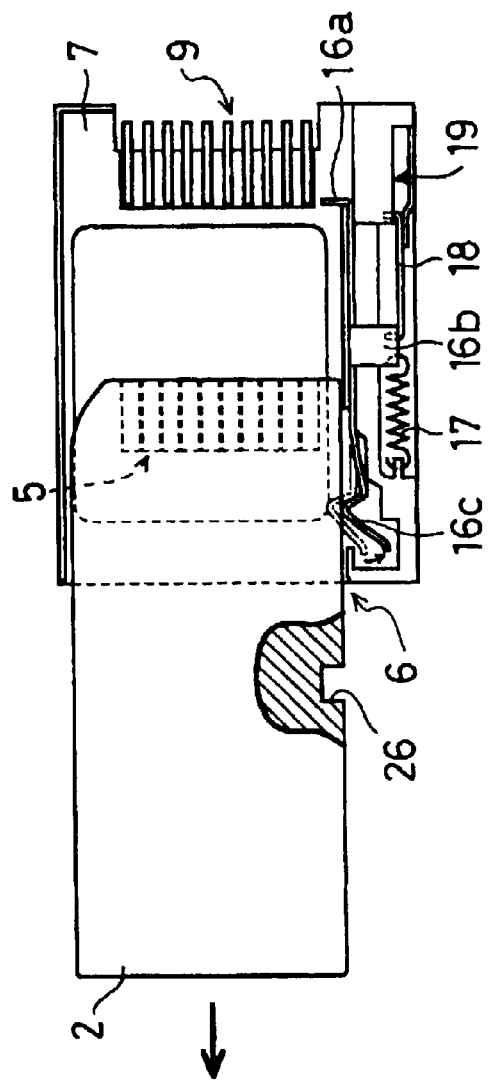
FIG. 9 is a view showing a situation in which the card is pulled out from FIG. 9G to FIG. 9H subsequently to FIG. 8.
Figure 9H:
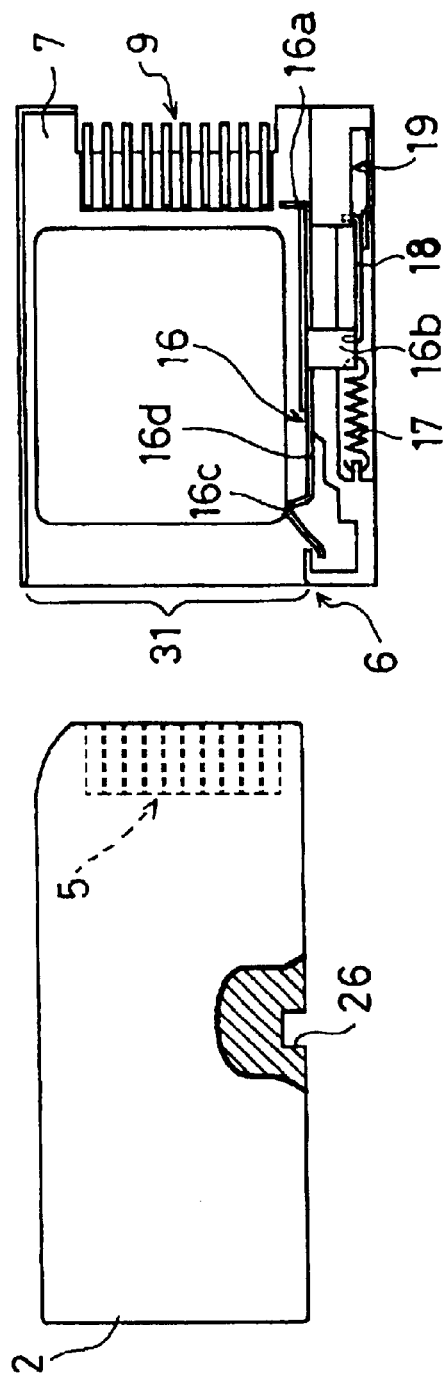

The engagement of the engaging portion 16c of the eject plate 16 and the notch 26 of the card 2 is also maintained when the eject plate 16 is pulled by the tension spring 17 and is moved from the "second position" of FIG. 8E to the "first position" of FIG. 8F and the card 2 is pushed and moved by the push-moving portion 16a. Accordingly, when the eject plate 16 completes the movement to the "first position" and is rested, it is also prevented that the card 2 is detached from the eject plate 16 by inertial force and is pulled out and ejected from the opening 6.

This state of FIG. 8F is a half lock state. Namely, since the engaging portion 16c and the notch 26 are engaged with each other, no card 2 is pulled out even when the connector 1 is directed so as to downwardly locate the opening 6 or vibration caused approximately by the normal use of a device is applied to the card 2. On the other hand, the eject plate 16 is set to the "first position", and the engagement of the engaging portion 16c and the notch 26 can be released at this time by the elastic deformation of the spring portion 16d as mentioned above. Accordingly, if the pulling-out force stronger than the elastic force of the spring portion 16d is applied to the card 2, the card 2 can be easily pulled out in the order of FIG. 8F, FIG. 9G and FIG. 9H.

The first embodiment mode is explained in the above description, but the present invention is not limited to this embodiment mode. For example, as shown by the following second and third embodiment modes, the raw material of the eject member is not limited to a metallic raw material. Further, the position of the engaging portion 16c of the eject plate 16 can be freely changed in accordance with a change in the position of the notch 26 of the card 2.

FIG. 10 shows a card connector 11 in accordance with the second embodiment mode of the present invention. An eject member 16 is arranged along a side wall (guide portion) 24 on one side of the housing 3. Differing from the first embodiment mode, this eject member 16 is manufactured by synthetic resin (e.g., PBT, 6T nylon, etc.), and is constructed by integrally forming a push-moving portion 16a, an engaging portion 16c and a spring portion 16d able to be elastically deformed. The eject member 16 is constructed so as to be elastically deformed and have a flexible property. The side wall 24 is shaved in a step shape, and an escaping space S for escaping the engaging portion 16c from a card storing space is formed.

Similar to the above first embodiment mode, the heart cam mechanism and the tension spring are connected to the eject member 16 although this connection is not illustrated. As this result, the eject member 16 can be held by switching the eject member 16 to a "first position" on the side close to the opening 6 of the housing 3, and a "second position" on the side far from the opening 6.

Figure 10A:
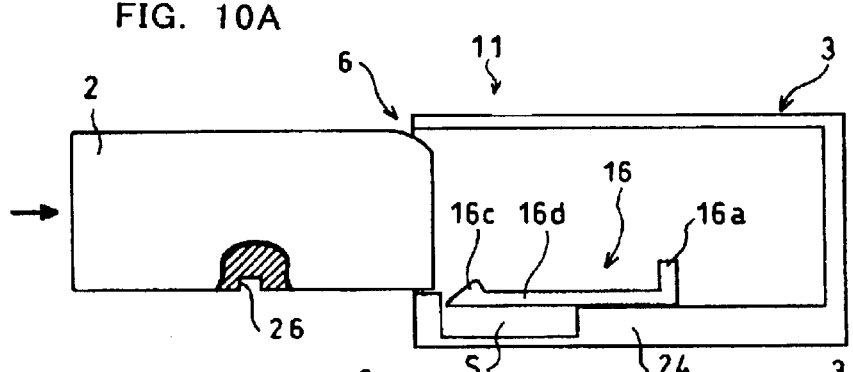
FIG. 10 is a plan view showing a situation in which the card is inserted into the connector of a second embodiment mode in the order of FIGS. 10A, 10B, 10C and 10D.
Figure 10B:
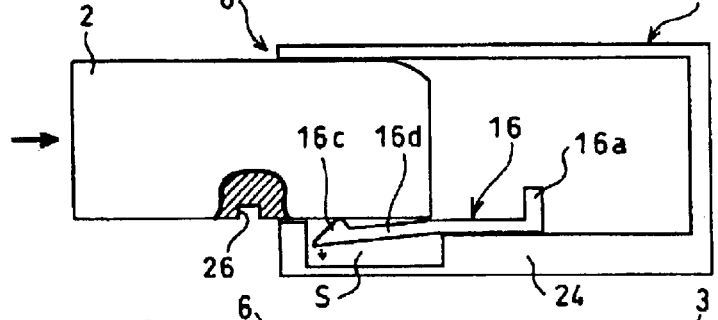
Figure 10C:
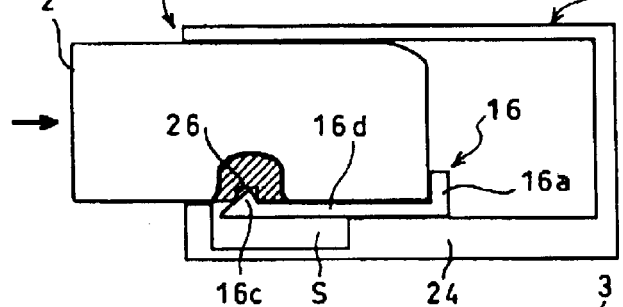
Figure 10D:
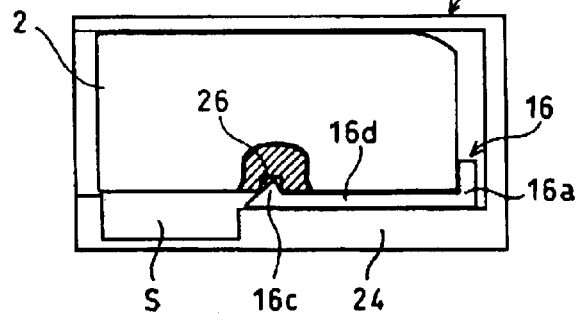

The inserting situation of the card into the connector in this second embodiment mode is shown in the order of FIGS. 10A, 10B, 10C and 10D. At this time, the operation performed by the eject plate 16 is completely similar to that in the first embodiment mode. The state of FIG. 10C is a half lock state in which the eject member 16 is located in the "first position", and the notch 26 and the engaging portion 16c are engaged with each other, but this engagement can be released. In this state, the card can be manually gripped and easily pulled out. The state of FIG. 10D is a state in which the card and the connector are electrically connected to each other. At this time, this state is set to a full lock state in which the eject member 16 is located in the "second position", and no engaging portion 16c can be escaped by the side wall 24, and no engagement of the engaging portion 16c and the notch 26 can be released.

The third embodiment mode shown in FIG. 11 is a modified example of the above second embodiment mode. In this third embodiment mode, the eject member 16 is arranged in a floor portion (guide portion) 24 of the housing 3. The engaging portion 16c of the eject member 16 is projected from below (instead of from the side) with respect to the card storing space 31, and can be engaged with the notch 26 formed on the floor portion side of the card. One portion of the floor portion 24 is opened and an escaping space S for downwardly escaping the engaging portion 16c from the card storing space is formed.

Figure 11A:
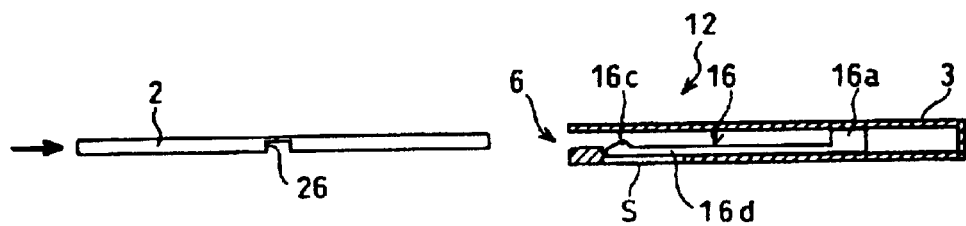
FIG. 11 is a side sectional view showing a situation in which the card is inserted into the connector of a third embodiment mode in the order of FIGS. 11A, 11B, 11C and 11D.
Figure 11B:
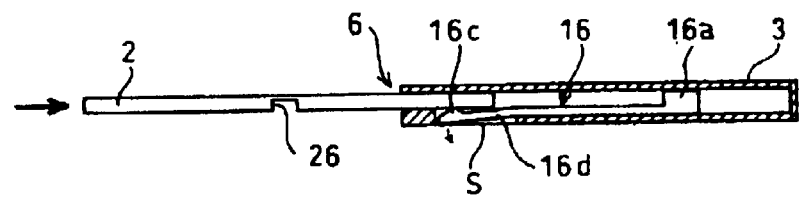
Figure 11C:
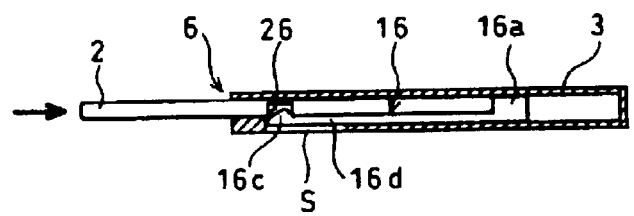
Figure 11D:
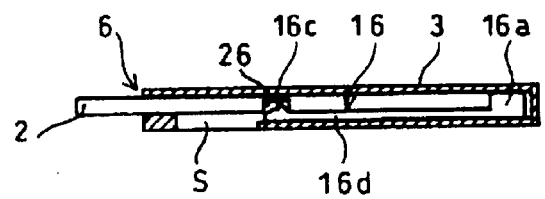

The inserting situation of the card into the connector in this third embodiment mode is shown in the order of FIGS. 11A, 11B, 11C and 11D. At this time, the operation performed by the eject member 16 is completely similar to that in each of the first and second embodiment modes. The state of FIG. 11C is a half lock state in which the eject member 16 is located in the "first position", and the notch 26 and the engaging portion 16c are engaged with each other. In this state, the card can be manually gripped and easily pulled out. The state of FIG. 11D is a state in which the card and the connector are electrically connected to each other. At this time, this state is a full lock state in which the eject member 16 is located in the "second position", and no engaging portion 16c can be escaped and no engagement of the engaging portion 16c and the notch 26 can be released.

In the second and third embodiment modes, durability is improved by forming the eject member 16 by a molded product of synthetic resin in comparison with the above first embodiment mode.

Namely, when the engaging portion 16c of the eject member 16 is constructed by bending a metallic material as in the first embodiment mode and a user compulsorily pulls the card 2 in the full lock state of FIG. 7D, a strong bending action is taken in a root portion of the engaging portion 16c resisting this pulling. Therefore, there is a fear that the engaging portion 16c is plastically deformed and the card 2 is pulled out in an extreme case. Otherwise, when no card 2 is pulled out but the engaging portion 16c is plastically deformed and broken, the projecting amount of the engaging portion 16c into the card storing space is reduced so that the holding force of the card 2 in the half lock state of FIG. 7C is reduced.

In contrast to this, in the second and third embodiment modes, the engaging portion 16c of the eject member 16 is constructed in a thick wall shape having a swollen wall. Therefore, no extreme bending action is taken in the root portion of the engaging portion 16c even when compulsory pulling-out force is applied to the card 2 in e.g., the full lock state of FIG. 1D. Accordingly, the card can be held with force stronger than the compulsory pulling-out force even when the card 2 is compulsorily pulled out in this way. Further, it is prevented that the eject member 16 is easily plastically deformed. Accordingly, the life of a part is extended and the card connector can resist the use for a long period.

The above effects can be similarly achieved by constructing only a portion of the engaging portion 16c among the eject member 16 by a molded product of synthetic resin, and constructing the other portions (the spring portion 16d, the push-moving portion 16a, etc.) by a metallic plate member. Further, if the engaging portion is formed in a thick wall shape, the effect of the improvement of durability of the above eject member is similarly shown even in the card connector of e.g., an eject button type using no heart cam mechanism.

Figure 12:
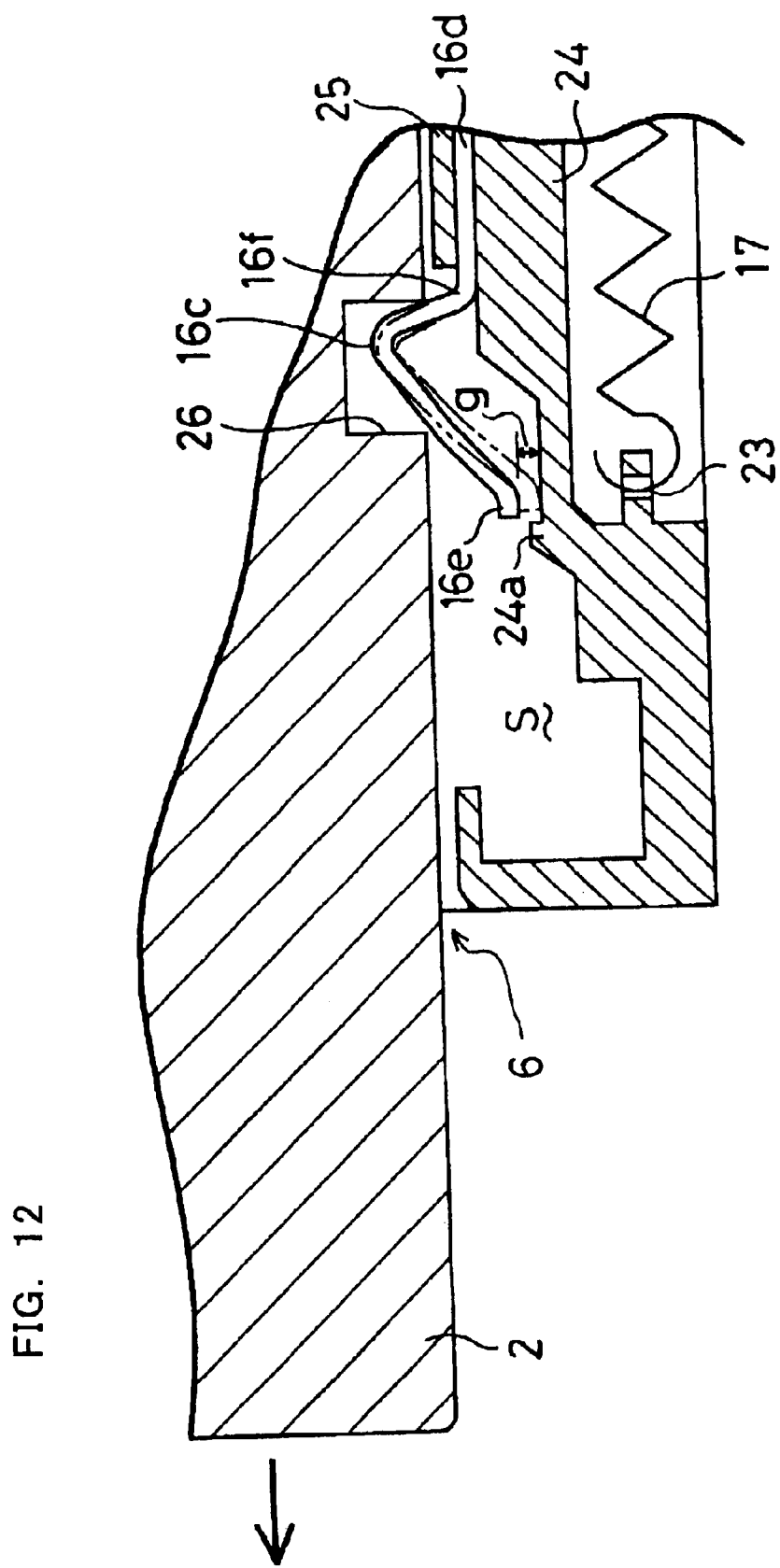
FIG. 12 is a view showing a construction for preventing the mistaken pulling-out of the card in the full lock state in the first embodiment mode.

It is possible to adopt a construction able to reliably resist the compulsory pulling-out of the user in the full lock state by forming the shape of the guide wall 24 as shown in FIG. 12 even when the eject member 16 is constructed by a metallic raw material of a thin plate shape as in the above first embodiment mode.

Namely, in this construction of FIG. 12, when the eject plate 16 is located in the "second position", a small clearance g is formed between the engaging portion 16c of the eject plate 16 and the guide wall 24, and a projection 24a as a regulating portion is arranged in the guide wall 24 in a position close to an end portion 16e of the engaging portion 16c. The projecting amount of this projection 24a is set to a small amount such that the projection 24a and the end portion 16e of the engaging portion do not interfere with each other when the eject member 16 is moved by normally pulling and inserting the card between the "first position" and the "second position".

The action of this construction will be explained. FIG. 12 shows a state in which the card 2 is inserted and the above full lock is attained. At this time, the eject plate 16 is held by the heart cam mechanism 19 in the "second position". When compulsory pulling-out force is applied from this state to the card 2 in error as shown by a thick arrow, the engaging portion 16c is pushed in the card pulling-out direction by an inner wall portion of the notch 26, and a portion 16f at a bending point of the root of the engaging portion 16c is elastically deformed. As this result, the engaging portion 16c is displaced as shown by a chain line, and is escaped by a small amount from the card storing space and its projecting amount is reduced. The end portion 16e of the engaging portion 16c then comes in contact with the guide wall 24.

Accordingly, when the card 2 is intended to be further pulled out from this state, the end portion 16e of the engaging portion abuts on a side portion of the projection 24a, and prevents the movement of the eject plate 16 to the "first position" (together with the above heart cam mechanism 19). As this result, the mistaken pulling-out of the card 2 is firmly prevented and the plastic deformation of the engaging portion 16c is also prevented so that durability is improved.

If the shape for arranging the regulating portion and the clearance in the guide wall is formed, the effects of the prevention of breakage of the engaging portion of the above eject member and the improvement of force resisting the compulsory pulling-out of the card are similarly attained even in the card connector of e.g., the eject button type using no heart cam mechanism.

In the second and third embodiment modes, since the eject member 16 is molded by synthetic resin, the cam groove of the heart cam 19 can be also formed on the eject member 16 side instead of the housing 3 side. At this time, one end of the above rod 18 is pivotally mounted to the housing 3 side, and the other end is freely swung and is inserted into the cam groove formed in the eject member 16.

In this case, a construction for swinging only the above other end side of the rod 18 inserted into the cam groove by the width of a forming area of the heart cam groove is formed instead of the construction for displacing the entire rod 18. Accordingly, it is possible to more precisely form a construction for biasing the other end of the rod 18 by a leaf spring 20 in the insertion direction into the cam groove, and the operation of the heart cam mechanism 19 can be more stably performed.

In the above description, the three embodiment modes are shown, but the push-moving portion 16a, the engaging portion 16c and the spring portion 16d of the eject plate 16 may be separately formed instead of the integral formation. For example, a portion abutting on the end portion of the card in its inserting direction may be constructed instead of the eject plate similarly to the already known slider, etc. (disclosed in e.g., Japanese Patent Laid-Open No. 2001-195546 and Japanese Patent No. 3083778). Further, a portion engaged with the notch of the card may be formed by a metallic leaf spring, and may be also formed by these connections.

The spring for giving the elastic force for discharging the card is not limited to the tension spring, but may be also a spring formed in a shape described in the above publications.

Further, in the above second and third embodiment modes, the push-moving portion 16a of the eject member 16 is constructed by molding synthetic resin in an L-shape. However, the shape of the push-moving portion 16a is not limited to this L-shape, but various shapes of the push-moving portion 16a such as a triangular shape, etc. can be adopted if the push-moving portion 16a can abut on the end portion of the card 2 and can push and move this end portion.

What is claimed is:

1. A card connector comprising:
    a housing for forming a card storing space for inserting a card from an opening, and having an input-output terminal corresponding to an electrode portion of the card;
    an eject member able to be moved along inserting and pulling directions of the card, and switched to a "first position" and a "second position" located on the side far from said opening in comparison with the "first position" by a heart cam mechanism;
    biasing means for biasing the eject member in the card pulling-out direction;
    a push-moving portion integrally formed in said eject member, and able to abut on an end portion of the card in its inserting direction;
    an engaging portion arranged in said eject member, and projected to the card storing space and engaged with a notch formed in the card when said end portion of the card in its inserting direction comes in contact with said push-moving portion;
    a spring portion arranged in said eject member, and escaping said engaging portion from the card storing space and releasing the engagement of said engaging portion and said notch by elastically deforming the spring portion; and
    a guide portion arranged in said housing so as to allow the escape of said engaging portion from the card storing space when said eject member is located in the "first position", and prevent the escape of said engaging portion from the card storing space when the eject member is located in the "second position".

2. A card connector according to claim 1, wherein said engaging portion and said spring portion are integrally formed in the eject member.

3. A card connector according to claim 1, wherein said eject member is formed by synthetic resin.

4. A card connector comprising:
    a housing for forming a card storing space for inserting a card from an opening, and having an input-output terminal corresponding to an electrode portion of the card;
    an eject member able to be moved along inserting and pulling directions of the card, and switched to a "first position" and a "second position" located on the side far from said opening in comparison with the "first position";
    biasing means for biasing the eject member in the card pulling-out direction;
    a push-moving portion integrally formed in said eject member, and able to abut on an end portion of the card in its inserting direction;
    an engaging portion arranged in said eject member, and projected to the card storing space and engaged with a notch formed in the card when said end portion of the card in its inserting direction comes in contact with said push-moving portion;
    a spring portion arranged in said eject member, and escaping said engaging portion from the card storing space and releasing the engagement of said engaging portion and said notch by elastically deforming the spring portion; and
    a guide portion arranged in said housing so as to allow the escape of said engaging portion from the card storing space when said eject member is located in the "first position", and prevent the escape of said engaging portion from the card storing space when the eject member is located in the "second position";
    wherein at least the engaging portion of said eject member is formed by synthetic resin, and the engaging portion is formed in a thick wall shape.

5. A card connector comprising:
    a housing for forming a card storing space for inserting a card from an opening, and having an input-output terminal corresponding to an electrode portion of the card;

an eject member able to be moved along inserting and pulling directions of the card, and switched to a "first position" and a "second position" located on the side far from said opening in comparison with the "first position";

biasing means for biasing the eject member in the card pulling-out direction;

a push-moving portion integrally formed in said eject member, and able to abut on an end portion of the card in its inserting direction;

an engaging portion arranged in said eject member, and projected to the card storing space and engaged with a notch formed in the card when said end portion of the card in its inserting direction comes in contact with said push-moving portion;

a spring portion arranged in said eject member, and escaping said engaging portion from the card storing space and releasing the engagement of said engaging portion and said notch by elastically deforming the spring portion; and a guide portion arranged in said housing so as to allow the escape of said engaging portion from the card storing space when said eject member is located in the "first position", and prevent the escape of said engaging portion from the card storing space when the eject member is located in the "second position";

wherein said guide portion is constructed such that said engaging portion engaged with said notch of the card can reduce a projecting amount to the card storing space when the card is connected to the connector and the eject member is held in the "second position" and pulling-out force is applied to the card; and a regulating portion able to prevent the displacement of the eject member to the "first position" is formed in the guide portion when said engaging portion of the eject member located in the "second position" reduces the projecting amount to the card storing space.

6. A card connector according to claim 2, wherein said eject member is formed by synthetic resin.

* * * * *

UNITED STATES PATENT AND TRADEMARK OFFICE
CERTIFICATE OF CORRECTION

PATENT NO. : 6,773,280 B2
DATED : August 10, 2004
INVENTOR(S) : Shoichi Sasaki et al.

It is certified that error appears in the above-identified patent and that said Letters Patent is hereby corrected as shown below:

<u>Title page,</u>
Item [73], Assignee, "U.S.T. Mfg. Co., Ltd. (JP)" should be changed to -- J.S.T. Mfg. Co., Ltd. (JP) --.

Signed and Sealed this

Twenty-eighth Day of June, 2005

JON W. DUDAS
*Director of the United States Patent and Trademark Office*